(12) United States Patent
Windle

(10) Patent No.: US 6,783,975 B2
(45) Date of Patent: Aug. 31, 2004

(54) ROTATABLE AERATING COMPOSTER

(76) Inventor: Harry N. Windle, 12425 NW. CR 231, Gainesville, FL (US) 32609

( * ) Notice: Subject to any disclaimer, the term of this patent is extended or adjusted under 35 U.S.C. 154(b) by 0 days.

(21) Appl. No.: 10/345,454

(22) Filed: Jan. 17, 2003

(65) Prior Publication Data

US 2004/0142461 A1 Jul. 22, 2004

(51) Int. Cl.$^7$ ................................................ C12M 1/02
(52) U.S. Cl. ................................. 435/290.3; 435/290.4
(58) Field of Search ........................... 435/290.1, 290.2, 435/290.3, 290.4; 71/11

(56) References Cited

U.S. PATENT DOCUMENTS

| | | | |
|---|---|---|---|
| 5,047,349 A | | 9/1991 | Eweson |
| 5,589,391 A | * | 12/1996 | Fink ........................ 435/290.3 |
| 5,759,850 A | | 6/1998 | Seymour ................. 435/290.3 |
| 5,762,225 A | | 6/1998 | Byrd ............................ 220/6 |
| 5,894,780 A | * | 4/1999 | Taniguchi ....................... 71/9 |
| 6,071,740 A | * | 6/2000 | Kerouac .................. 435/290.3 |

FOREIGN PATENT DOCUMENTS

DE 3418755 A1 * 11/1985

* cited by examiner

*Primary Examiner*—David A. Redding
(74) *Attorney, Agent, or Firm*—Sven W. Hanson

(57) ABSTRACT

The present invention is a device and method for efficient composting of organic matter using a low-cost composting structure and high efficiency methods. A composting container incorporates rigid insulated panels to form an insulated composting container of a generally cylindrical shape with polygonal cross-section. The insulated panels provide high thermal efficiency at low cost to help maintain composting temperatures. A rigid frame supports the panels and allows the container to be rotated. An internal manifold or plenum supplies air while the container is stationary or rotating. Rotation in various embodiments is effected by motor driven rollers bearing on external hoops integrated to the container support frame. In preferred methods, the container is rotated at rates slower than one revolution per minute as air is introduced.

13 Claims, 4 Drawing Sheets

ROTATABLE AERATING COMPOSTER

BACKGROUND OF THE INVENTION

The present invention pertains to devices and processes for aerobic composting of organic matter. Organic waste matter such as animal manure, vegetative matter, food wastes and the like may be decomposed by action of aerobic, oxygen consuming, bacteria and similar organisms. This decomposition is often termed composting. Many processes and devices are available for carrying out and speeding composting of organic wastes. It is a common objective with these processes and devices to ensure sufficient available oxygen for efficient aerobic action. When decomposition occurs without oxygen—anaerobically—the decomposition by-products include noxious gases and undesirable materials.

Both to ensure thorough oxygenation and complete inoculation of the waste with bacteria, the composting material is often mixed, turned or tumbled in some manner. Air entrainment or injection is also attempted in some known processes. Mixing and addition of air is problematic in practical applications where large waste streams must be handled.

The U.S. Patent to Byrd (U.S. Pat. No. 5,766,225) is exemplary of many devices for small waste streams. A container is provided with a multiple of small container holes or openings through which air enters the container. The container may be rotated to mix the contained waste material. However, the Byrd devices are not practical for larger volumes. U.S. Pat. No. 5,759,850 to Seymour and U.S. Pat. No. 5,047,349 to Eweson disclose various other rotary containers for mixing and aerating waste materials for beneficial composting. One common weakness in these designs is the undue complexity and subsequent high cost of the devices. Their complexity often results in operational failure. A limitation of many of these devices and processes is due to the need to maintain relatively high operational temperatures. The inherent corrosive environment of the materials is an added difficulty. Peak efficiency of aerobic bacterial decomposition is achieved at temperatures in the range of 120 to 150 degrees. Although aerobic composting is exothermic, in cold climates such as in northern geographical regions, low ambient temperatures in winter require external heating of composting systems to maintain the desired temperature. Typically, this means the composting process must be operated within a temperature controlled space, adding to cost and complexity. What is needed is a composting device and system which is simple and that reduces the beat losses from the exothermic composting process.

SUMMARY OF THE INVENTION

The present invention is a device and method for efficient composting of organic matter using a low-cost composting structure and high efficiency methods. An inexpensive design incorporates low cost rigid insulated panels to form an insulated composting container of a generally cylindrical shape with polygonal cross-section. The insulated panels provide high thermal efficiency to help maintain composting temperatures. A rigid frame supports the panels and allows the container to be rotated. An internal manifold or plenum is located along the length of the container to supply air to a volume of waste matter contained in the container in use. An air supply is connected to the manifold to deliver air while the container is stationary or rotating. Rotation in various embodiments is effected by motor driven rollers bearing on external hoops integrated to the container support frame.

In a preferred embodiment, the container consists of eight panels forming an octagonal cross-section. The octagonal shape promotes mixing at a high fill level that is an improvement over cylindrical containers. This improved mixing of the present inventive device and methods makes unnecessary the internal mixing elements such as the screws and baffles used in many of the prior art devices. However, the use of such internal mixing elements is possible in combination with the benefits of the present inventive concepts.

The invention includes methods of composting in which the inventive device is rotated at relatively slow rates that induce intermittent tumbling of the composting matter. This action increases the mixing and aeration action to improve the biological processes and decomposition of the matter. In preferred methods, the container is at least partially filled with waste matter and rotated at rates slower than one revolution per minute as air is introduced. The container is alternatively rotated and held stationary for periods of time.

The invention may be more fully understood by reference to the following figures and details of exemplary embodiments. Alternative embodiments of the invention as claimed, and providing the benefits of the novel concepts of the invention, are contemplated and will be obvious from these explanations.

DESCRIPTION OF THE PREFERRED EMBODIMENTS

Figure 1:
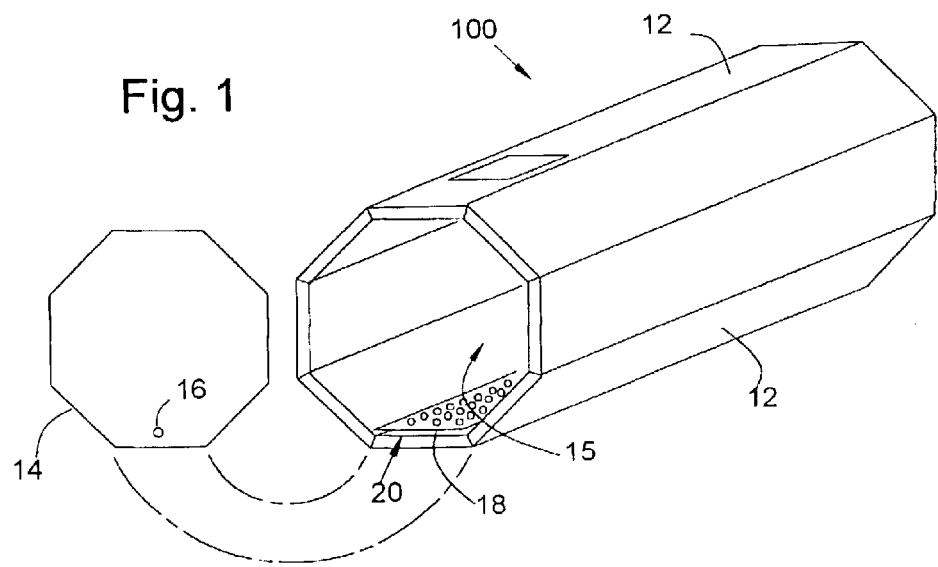
FIG. 1 is a perspective view of a simplified embodiment of the present invention.

FIG. 1 depicts a view of a simple composting container according to the present invention. A container 100 is formed from eight panels 12 cojoined at their opposing edges to form an octagonal cross-sectional body having opposing ends. Alternative configurations have at least four such panels forming a polygonal cross-section. The ends are both closed by endcaps 14 (the second endcap is not visible in the figure) to define an interior space 15. The panels are configured with thickness and specific materials resulting in an thermally insulating effect. The insulated panels preferably have an effective insulation resistance value (R), through the thickness of each panel, of at least 17 (as determined using standard ASTM C236). This equates to a thermal conduction of 0.06 BTU/hr·ft²·F (BTU per hour per foot squared per degree Fahrenheit)

Prototype composting containers have been constructed with steel faced urethane foam panels sold by Metecno S.P.A Corp. Italy (API of Ceres, Calif.) under the Azteco trademark and having the designation AW-300 and AW-300A. These panels have an R value of 17.1 at a thickness of 2 inches. The combination of light weight, insulating properties and corrosive resistance of galvanized steel skins of this construction is particularly beneficial. The endcaps 14 are preferably formed of a section, or joined sections, of the same insulating panel material. The container preferably has a openable door to ease entry and removal of material to be composted.

Such a container as described helps to maintain the temperatures condusive to rapid aerobic composting. Because these temperature arc preferably in the range of 120 to 150 degrees Fahrenheit, well above ambient temperatures in typical natural environments, an uninsulated composting container, such as in the prior art, loses significant heat which must be replaced at great cost if the desired temperature is to be maintained. The insulated container of the present invention maintains a higher temperature without addition of external heat energy.

A requirement of aerobic fermentation, as is desired, is abundance of surrounding oxygen. Waste matter that is deprived of oxygen, or is provided with insufficient oxygen, with be dominated by anaerobic processes that are not effective in practical decomposition of waste streams. In FIG. 1, the end cap 14 includes an air port that allow pressurized air to be delivered to a manifold 18 within the container 100. The manifold 18 consists of a rigid sheet that is spaced slightly inward from one of the panels 12 of the container. The intervening space defines a plenum 20 to which the air supply is delivered. From the plenum 20, the air passes through small holes in the manifold and into the interior space 15 of the container. The manifold is preferably formed of sheet aluminum or stainless steel extending the entire length of the container between the end caps 14. The manifold holes are preferably evenly dispersed over the area of the manifold and have a total cross-sectional area of about 33 percent of the total manifold surface area. The holes should be sufficiently small that waste matter does not easily fall through the holes and fill the plenum 20. A hole size of 3/32 inches has been used successfully. To some degree, the hole size may be altered depending the nature of the particular waste to be processed.

Figure 2A:
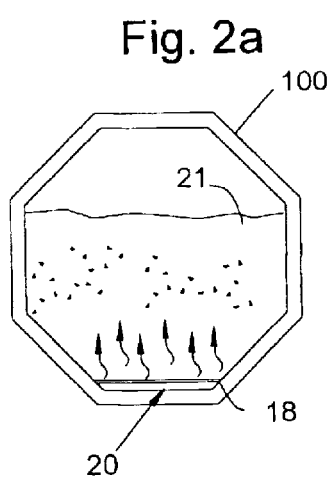
FIGS. 2a, 2b, and 2c are cross-section views of the embodiment of FIG. 1 illustrating operation steps of the invention and inventive methods.
Figure 2B:
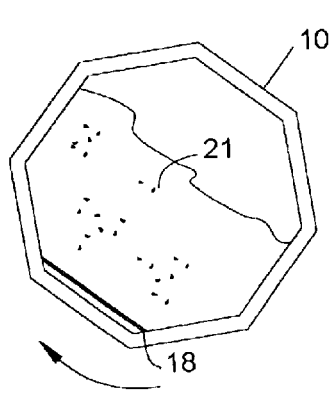
Figure 2C:
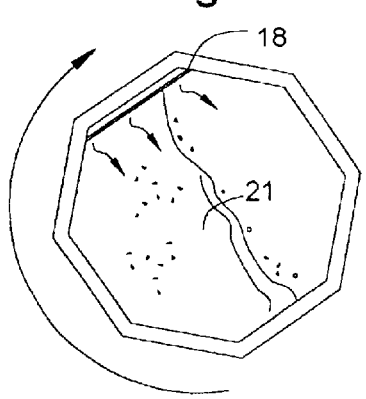

The air is preferably delivered to the plenum at a pressure sufficient to be driven into a volume of waste matter 23 deposited in the interior space 15 as shown in FIG. 2a. To aid in breaking up and mixing the waste matter, the container is slowing rotated about the longitudinal axis of the container as illustrated relatively sequentially in FIGS. 2b and 2c. Due to the effectiveness of the combination of forced air and such tumbling, the tumbling need not be rapid. With many various waste materials processed by the present device and methods, a rotation rate of 5 to 6 minutes per revolution has found to be effective. High rotation rates are not desired due to the packing and increased density of formed balls of matter that result. Rotation rates faster than 1 (one) minute per revolution are not recommended.

A preferred rotation schedule consists of slow rotations separated by dwell periods. This can provide effective mixing and aeration to ensure decomposition of the complete volume of waste with a minimum of energy input. Preferably, during the dwell periods, the manifold is positioned at the bottom, below the waste volume, to continue aeration. However, with rotation and tumbling of the waste, effective processes can be employed in some cases with the manifold flushing the open space above the waste matter as in the configuration of FIG. 2c.

Figure 3:
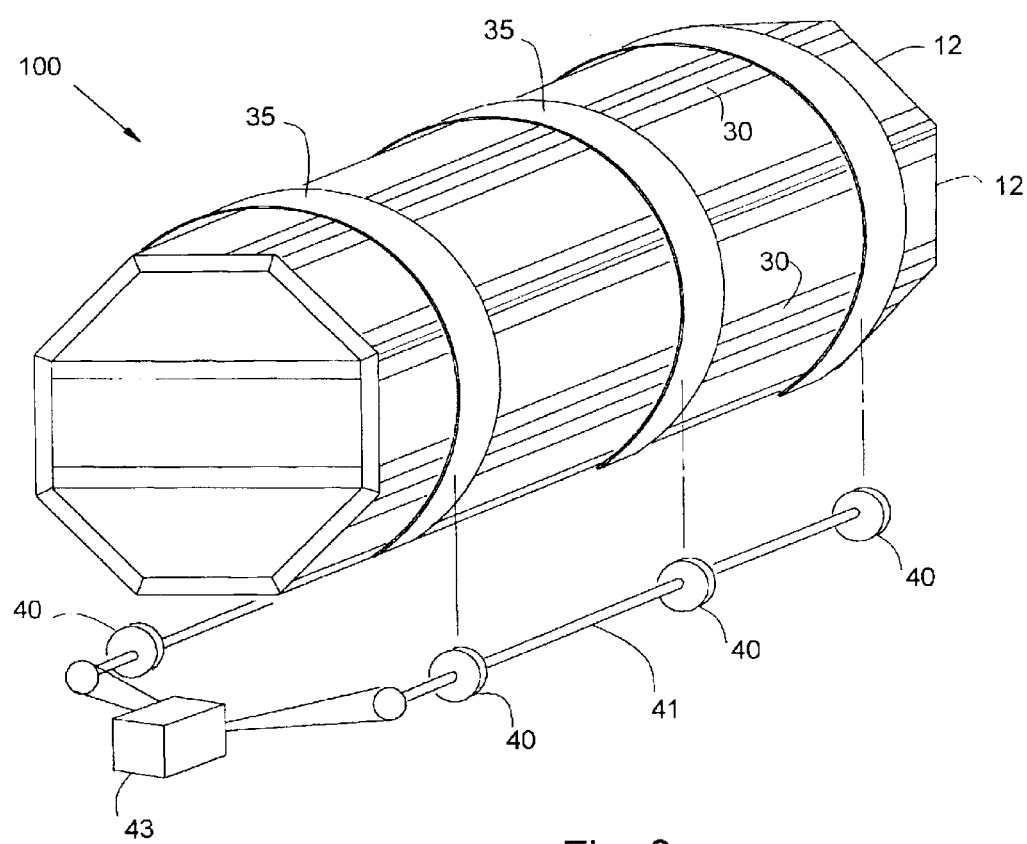
FIG. 3 is a perspective view of a preferred embodiment of the invention.
Figure 4:
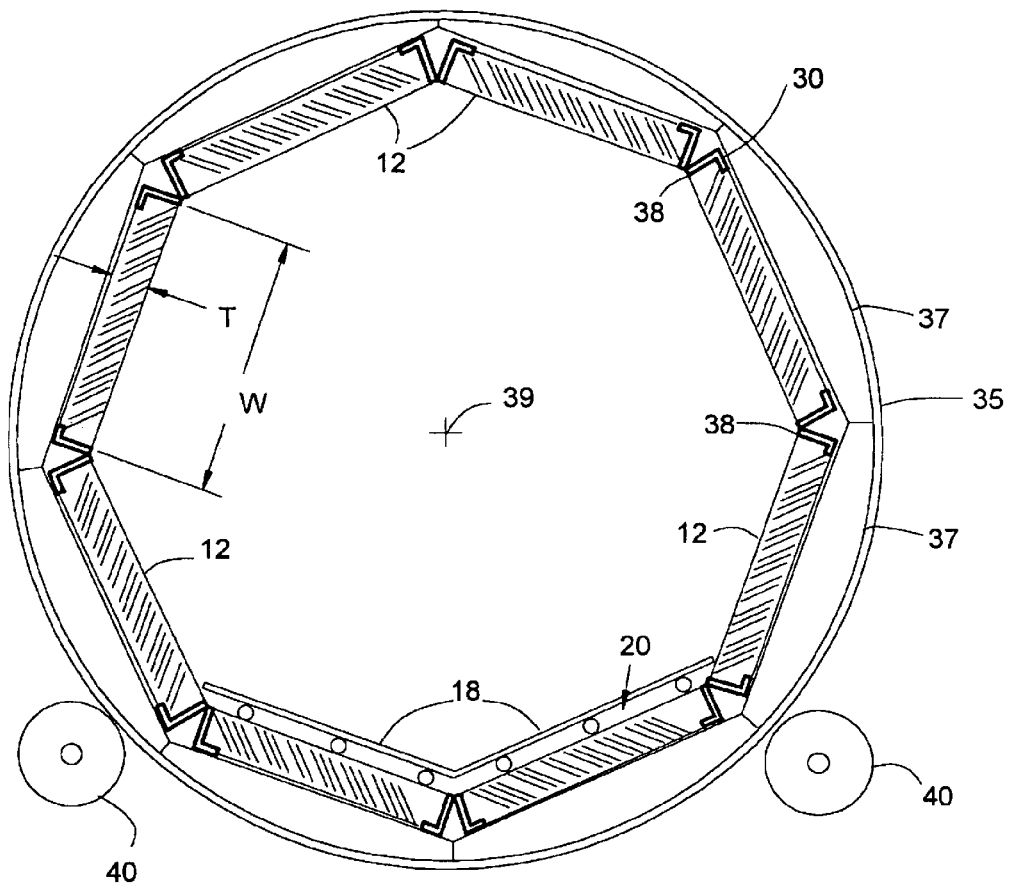
FIG. 4 is a cross-section view of the embodiment of FIG. 3.

In the embodiment of FIG. 1, the insulated panels and endcaps may be joined in any of a variety of ways. However, due to the relatively low strength of the bare panels, practically sized composting containers require a rigid supporting frame to retain the panels. In the embodiment shown in FIGS. 3 and 4 a composting device according to the present invention is formed by supporting and interconnecting flat insulated panels 12 with longitudinal rigid structural elements 30 which extend the full length of the panels between the endcaps. FIG. 3 is a perspective view of the container 100 and elements by which the container is rotated. FIG. 4 is a cross-section view of the same embodiment.

The particular longitudinal structure elements shown in FIGS. 3 and 4 are formed of standard "L" shape structural aluminum sections (when viewed in cross-section). Both side edges of each insulated panel 12 rests within, and are supported by, one leg of the L-section. Each L-section structural element extends the length of the device. The structural element serves to maintain the relative position of the insulated panels and to provide stiffness and strength to resist the forces and moments induced by the contained waste during use. To maintain the load path and connection between the insulated panels and the structural elements, the edges of each panel 12 are preferably bonded to the mating structural element. This is accomplished by typical application of any of various adhesives and similar surface bonding agents (not shown). These include high density silicone adhesives, room temperature vulcanizing (RTV) adhesives, sulphur based adhesives and similar high strength adhesives compatible with the particular insulation and the structural element materials. The bonding agent also serves to ensure liquid-tight connections between the elements to ensure that liquids within the container do not leak out.

As shown in FIG. 3, the structural elements are supported by a number of rigidly connected structural hoops 35. The functions of the hoops 35 include assisting to maintain the relative position of the structural elements and insulated panels 12 in their octagonal cross-sectional shape while loaded and unloaded, and providing a means of supporting and rotating the container 100 in use. The manner in which the hoops 35 are attached to the structural elements can be seen in FIG. 4. The hoops 35 are concentric with the container cross-section and surround the panels 12 and structural elements 30. To increase stiffness of the assembly and to form a strong connection between the structural elements 30 and the hoops 35, intercostal chord elements 37 are introduced. The intercostals 37 are formed of sheet metal and are shaped to fit tightly within the inside curvature of the hoops 35 and are secured there by mechanical fasteners or by welding. The structural elements 30 are in turn secured similarly to the straight inside edge of the intercostal 37. Although only a single intercostal 37 is shown connected to each structural element 30, preferably two or more parallel intercostals are used at each structural element connection to each hoop 35. FIG. 4 also illustrates the common width W and thickness T of the panels 12. The combination of insulated panels, longitudinal structural elements and supporting hoops make possible large volume composters of relatively low weight. Large volume is desired to quickly compost large waste streams as found in agricultural businesses. Composters such as described herein and having a nominal diameter greater than 50 inches have been found to be successful in those situations. Prior art designs of these sizes must typically be constructed much more heavily, with greater metallic structural elements, adding to cost.

As seen in FIG. 4, the L-sections used in the embodiment shown each meet with an adjacent L-section along an interior longitudinal edge 38. This line of contact should be sealed to prevent leakage through past any potential gap at this point. This may be accomplished by welding the tips of the adjacent L-section legs, by a mechanical seal, or by application of a scaling compound at the line contact.

FIG. 4 illustrates a preferred manifold design for larger containers. The manifold 18 is constructed of sheet metal spaced a small distance from the inside surface of two of the insulated panels 12. Longitudinal spacers 39 may be used to ensure the space defines a sufficient plenum 20 for accepting and delivering air through the manifold. The manifold 18 includes a pattern of through-holes over substantially the entire area of the manifold 18. Tight sealing of the manifold, at the edges, to the adjacent panels is not crucial. For clarity, the air delivery means is not shown in FIGS. 3 and 4 but is illustrated in FIG. 5.

As previously discussed, rotation of the container in use is desired for optimum performance. In FIG. 4, supporting rollers 40 bear against the hoops to maintain the container. The rollers 40 are fixed in position while allowed to rotate. When the rollers 40 are attached to a drive means, their rotation drives the rotation of the hoops and consequently the container rotates about its central longitudinal axis 39. The rollers 40 are selected and designed to achieve sufficient friction against the hoop 35 to transmit the needed torque. Alternatively, the rollers may drive the hoops by integral gear teeth, however such means is complex and costly and to be avoided when possible. Practical systems may employ plastic or rubber faced rollers if the contacting hoop 35 outer surface is not overly smooth. Roughing of the hoop surface, such as by knurling, may increase friction if necessary.

FIG. 3 illustrates one means of driving the rollers 40 to effect rotation of the container 100. At each side of each of three hoops 35, one roller 40 is positioned to contact the hoop and hereby support the container 100. It will be obvious that one, two or more rollers may be used at each location as other design parameters, such as roller and hoop width, dictate. The rollers 40 of each side of the container 100 are respectively interconnected, and supported, by associated drive shafts 41. The drive shafts 41 are supported in typical manner by bearing blocks and support structure. A electric motor 43 provides drive power transmitted by chain and sprocket to the drive shafts 41. The elements are configured to preferably drive all rollers in a manner to induce rotation of the contain in a common direction. Alternative roller drive means and configurations are contemplated and will be obvious.

Figure 5:
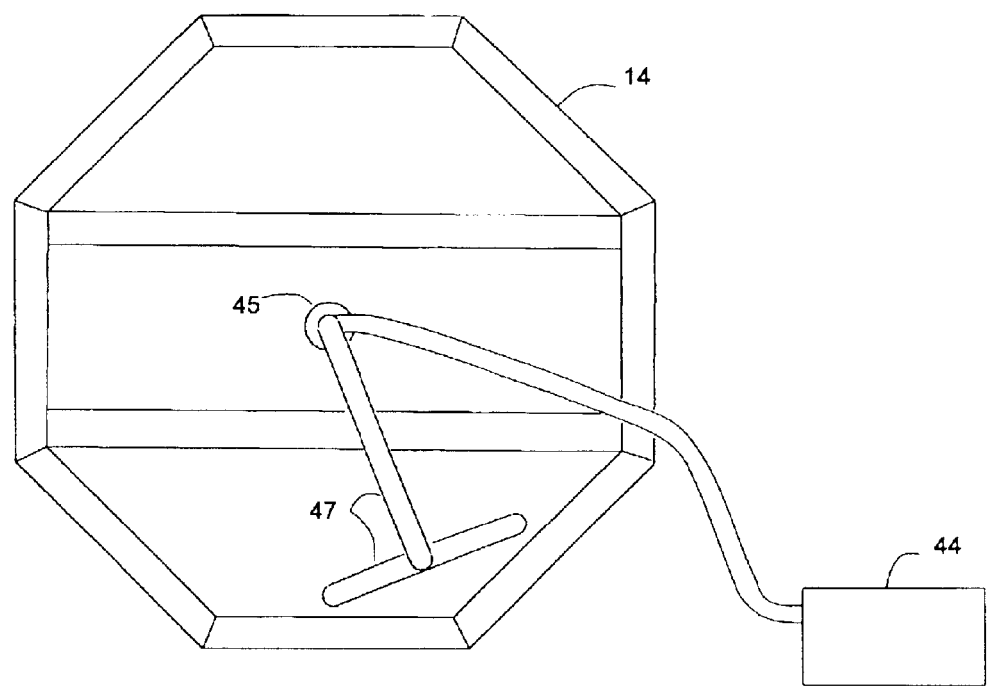
FIG. 5 is a end view of the invention showing one means of air delivery to the container.

FIG. 5 depicts an air delivery system according to one embodiment of the invention. An air pump 44 delivers pressurized air through a flexible hose to a slip joint connection 45 located on the centerline of the container endcap 14. The slip-joint connection 45 accommodates the relative motion between the air pump 44 and the rotating container 100. Various other means of accomplishing this function are generally known and contemplated for use with the present invention. From the connection 45, the air is directed to the end of the endcap, and passes through the endcap at a location aligned with the manifold plenum shown in FIGS. 1 and 4. In the embodiment shown, the air delivery piping 47 spits at a "T" to deliver air to two air aligned plenum sections as shown in FIG. 4.

Example: A prototype container was built and used to process waste matter consisting of chicken manure. The container had a overall length, between the interior of the endcaps, of 125 inches and was formed of insulated panels having 2 (two) inches thickness dimension in a octagonal cross-section pattern. The structural elements consisted of L shape aluminum sections having legs of two and four inch dimension, respectively. The insulated panels were bonded to the aluminum sections with silicone based RTV adhesive. As well, the insulated panels were mechanically captured to the structural elements by smaller L-shape brackets attached to the structural elements by fasteners and bearing on the inside surface of each insulated panel. The formed container had a nominal internal diameter of 58 inches (the orthogonal dimension between opposing panels). A manifold consisted of two sheets of stainless steel perforated by holes of 3/32 inches diameter on center-to-center spacing of 5/32 inches in a repeated two-dimensional pattern. The manifold sheets were spaced approximately 1 (one) inches from the inside surfaces of two adjacent panels. Air was supplied at a pressure of 5 (five) PSI (pounds per square inch). The rate of air supplied was approximately 60 cubic feet per minute. The container was initially partially filled with 150 cubic feet of chicken manure. The prototype composting container, after filling with manure, followed the below process steps, in sequence:

a. rotate three revolutions at a speed of 5 minutes per revolution, b. pump air for 60 seconds, c. rest without motion for 5 minutes, d. repeat steps (b) and (c) continuously, while e. every 6 hours rotate one revolution at a speed of 5 minutes per revolution.

Each time the device was stopped, after rotation, it is positioned with the air manifold slightly past the bottom-most position. The device was then reversed slightly to bring the manifold to the bottom position. This allows the waste to dwell in a level orientation with respect to the manifold. Processing in this manner for 72 hours produced a composted material with minimal odor. Visual observations indicated that the octagonal interior shape of the device induced intermittent tumbling which assisted in breaking up the manure. This contrasted with the prior art circular composters which result in more continuously tumbling which typically induces detrimental formation and growth of hardened balls of manure. The reduced tumbling rate of the present device also lessens this effect, resulting in a more homogeneous mixture and more even and thorough fermentation.

Another benefit of the present invention is a composter that is relatively inexpensive and easily transported. Embodiments of the size of the example prototype are easily transported on standard width trailers approved for use on public highways. The ability to fabricate off-site and cheaply transport the device to the use site reduces overall cost. The rapid composting rates provided by the device allows one or more to replace larger, more costly systems.

The preceding discussion is provided for example only. Other variations of the claimed inventive concepts will be obvious to those skilled in the art. Adaptation or incorporation of known alternative devices and materials, present and future is also contemplated. As well, the incorporation of typical monitoring and ancillary processes will be obvious to those skilled in the art. For example, temperature detecting and monitoring devices and watering and dewatering systems may also be incorporated as well as automatic rotation based on temperature detection signals. The intended scope of the invention is defined by the following claims.

I claim:

1. A device for aerobic composting comprising:

a plurality of planar insulating panels;

a rigid frame supporting the panels to define a container having opposing ends;

a manifold within the container, the manifold extending between the opposing ends;

means of rotating the container; and a air supply connecting to the manifold for delivering air to the manifold while the container is rotating.

2. The device of claim 1, wherein:

the frame includes at least two circumferential hoops to support the container; and wherein the means of rotating the container comprises at least two rollers supporting each hoop, and at least one roller connected to a electric drive.

3. The device of claim 2, wherein:

the at least two hoops comprises three hoops; and the means of rotating the container comprises six sets of rollers, each set comprising at least one roller, each set of rollers having at least one roller connected to a electric drive, and each hoop supported by two spaced sets of the rollers.

4. The device of claim 1, wherein:

the manifold comprises at least one perforated sheet spaced from at least one inside surface of at least one panel.

5. The device of claim 4, wherein:

the manifold comprises a first and a second perforated sheet spaced from a inside surface of a first and second panel, respectively.

6. The device of claim 1, wherein:

the container has an internal diameter greater of 50 inches.

7. The device of claim 1, wherein:

each panel has a insulating R value of at least 17.

8. The device of claim 7, wherein:

each panel comprising a urethane foam, and has a thickness dimension of at least 2 inches.

9. The device of claim 1, wherein:

the plurality of panels comprises eight panels.

10. A device for aerobic composting comprising:

an container comprising:
   at least four planar insulated panels,
   a rigid frame joining the panels to define a polygonal cross-sectional shape, and
   two opposing insulated endcaps joined with the insulated panels to define a closed interior space; and at least two circular hoops encircling the container and secured to the frame;

means of supporting and rotating the container about a longitudinal center axis; and a supply air for delivering air to the container.

11. The device of claim 10, wherein:

the at least four insulated panels are eight insulated panels.

12. The device of claim 11, wherein:

each insulated panel comprises an insulating foam sandwiched between sheet metal, and each panel has a thickness dimension of at least two inches.

13. The device of claim 12, wherein:

the air supply comprises:
   an air pump connected to a manifold, the manifold extending between the opposing endcaps.

* * * * *